United States Patent
Shim et al.

(10) Patent No.: US 10,759,895 B2
(45) Date of Patent: Sep. 1, 2020

(54) POLYMERIZABLE COMPOSITION FOR OPTICAL MATERIAL

(71) Applicant: SKC CO., LTD., Gyeonggi-do (KR)

(72) Inventors: Jongmin Shim, Gyeonggi-do (KR); Junghwan Shin, Gyeonggi-do (KR); Seung Mo Hong, Incheon (KR); Hyuk Hee Han, Gyeonggi-do (KR); Jung Hwan Myung, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 117 days.

(21) Appl. No.: 16/232,746

(22) Filed: Dec. 26, 2018

(65) Prior Publication Data

US 2019/0202968 A1 Jul. 4, 2019

(30) Foreign Application Priority Data

Dec. 28, 2017 (KR) .................. 10-2017-0182078

(51) Int. Cl.

| C08G 18/38 | (2006.01) |
|---|---|
| C08G 18/73 | (2006.01) |
| C08G 18/75 | (2006.01) |
| C08G 18/76 | (2006.01) |
| C08G 18/24 | (2006.01) |
| G02B 1/04 | (2006.01) |
| C08G 18/72 | (2006.01) |

(52) U.S. Cl.
CPC ....... C08G 18/3876 (2013.01); C08G 18/242 (2013.01); C08G 18/721 (2013.01); C08G 18/722 (2013.01); C08G 18/73 (2013.01); C08G 18/755 (2013.01); C08G 18/757 (2013.01); C08G 18/758 (2013.01); C08G 18/7621 (2013.01); C08G 18/7642 (2013.01); G02B 1/04 (2013.01); G02B 1/041 (2013.01)

(58) Field of Classification Search
CPC .. C08G 18/242; C08G 18/3876; C08G 18/52; C08G 18/721; C08G 18/722; C08G 18/73; C08G 18/755; C08G 18/757; C08G 18/758; C08G 18/7621; C08G 18/7642; G02B 1/04; G02B 1/041
See application file for complete search history.

(56) References Cited

U.S. PATENT DOCUMENTS

2015/0226379 A1* 8/2015 Lee .................. B63B 25/14
62/48.1
2016/0304701 A1* 10/2016 Kakinuma ........... C08K 5/3475

FOREIGN PATENT DOCUMENTS

| EP | 2660260 | 11/2013 |
| EP | 2891672 | 7/2015 |
| JP | 6095646 | 3/2017 |
| KR | 101704951 | 2/2017 |
| WO | 2016/153061 | 9/2016 |

OTHER PUBLICATIONS

Office Action issued by the Korean Intellectual Property Office dated Dec. 12, 2018.
Extended Search Report Issued by European Patent office dated May 24, 2019.

* cited by examiner

*Primary Examiner* — Christopher M Rodd
(74) *Attorney, Agent, or Firm* — IP & T Group LLP

(57) ABSTRACT

An embodiment relates to a polymerizable composition for an optical material and a polythiourethane-based compound prepared therefrom. The polythiourethane-based compound is excellent in appearance with low generation rates of stirae and bubbles.

13 Claims, No Drawings

POLYMERIZABLE COMPOSITION FOR OPTICAL MATERIAL

TECHNICAL FIELD

An embodiment relates to a polymerizable composition for a polythiourethane-based optical material and a polythiourethane-based compound prepared therefrom. The polythiourethane-based compound is excellent in appearance as the generation rates of striae and bubbles are low.

BACKGROUND ART OF THE INVENTION

Optical materials using plastics are lightweight, hardly breakable, and excellent in dyeability as compared with optical materials made of inorganic materials such as glass. Therefore, plastic materials of various resins are widely used as optical materials for eyeglass lenses, camera lenses, and so on. Recently, due to an increased demand of users for higher performance and convenience, studies have continued on optical materials having such properties as high transparency, high refractive index, high Abbe number, low specific gravity, high heat resistance, and high impact resistance.

Examples of widely used optical materials include polythiourethane compounds obtained by polymerizing a polythiol compound and a polyisocyanate compound. However, when a polythiol compound and a polyisocyanate compound are reacted to prepare a polythiourethane-based optical material, the reactivity changes depending on the kinds of the polythiol compound and the polyisocyanate compound and the kind and content of the catalyst, which causes a problem that the polythiourethane-based optical material thus produced has appearance defects such as striae and/or bubbles.

As an alternative to the above, Korean Patent No. 1704951 discloses a method for preparing a polyurethane resin composition in which an alcohol compound is employed such that the ratio of hydroxyl groups to isocyanate groups is 10 to 20% by mole.

PRIOR ART DOCUMENT

Patent Document (Patent Document 1) Korean Patent No. 1704951

DISCLOSURE OF THE INVENTION

Technical Problem to be Solved

The above-mentioned Korean patent, however, still has the problems that the improvement in striae or bubbles is insufficient and that the production yield is low.

Accordingly, an embodiment aims to provide a polymerizable composition capable of producing a plastic lens that is excellent in appearance without striae and/or bubbles, regardless of the kind of the polyisocyanate, the polythiol, and the catalyst.

Solution to the Problem

An embodiment provides a polymerizable composition, which comprises 1 to 5 types of a polyisocyanate compound, 1 to 5 types of a polythiol compound, and a catalyst represented by the following Formula 1, wherein R calculated by the following Equation 1 is a real number of 9.5 to 19.5:

$$R = 10 \times \left(\frac{A}{B} + Q\right) \quad \text{[Equation 1]}$$

In the above Equation 1, $$A = \sum_{i=1}^{n}\left(\frac{4200}{N_i} \times f_i\right),\ f_i = \left(\frac{m_i W_i}{o_i}\right)\Big/C,\ \text{and}\ C = \sum_{i=1}^{n}\left(\frac{m_i W_i}{o_i}\right),$$

n is the number of kinds of the polyisocyanate compound, $N_i$ is the content (% by weight) of NCO in the i-polyisocyanate compound, $m_i$ is the number of functional groups in the i-polyisocyanate compound, $W_i$ is the amount (g) of the i-polyisocyanate compound added, $o_i$ is the weight average molecular weight (g/mole) of the i-polyisocyanate compound, $B = \sum_{j=1}^{l}(S_j \times P_j)$, l is the number of kinds of the polythiol compound, $S_j$ is the equivalent weight (g/eq.) of the j-polythiol compound, $$P_j = \left(\frac{u_j V_j}{t_j}\right)\Big/Z\ \text{and}\ Z = \sum_{j=1}^{l}\left(\frac{u_j V_j}{t_j}\right),$$

$u_j$ is the number of functional groups in the polythiol compound, $V_j$ is the amount (g) of the j-polythiol compound added, $t_j$ is the weight average molecular weight (g/mole) of the j-polythiol compound, $Q$ is $\dfrac{\text{The molecular weight of the substituent }E\text{ of the compound represented by the formula 1(g/mol)} \times g \times D}{\text{The molecular weight of the compound represented by the following formula 1(g/mol)} \times K \times 1000}$

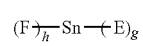

[Formula 1]

In the above Formula 1,

E is a halogen compound,

F is an aliphatic hydrocarbon having 1 to 30 carbon atoms or an aromatic hydrocarbon having 6 to 30 carbon atoms, h and g are each independently an integer of 1 to 3, h+g is 4, K is the amount of the compound represented by the above Formula 1 based on 100 parts by weight of the total amounts of the polyisocyanate compound and the polythiol compound, D is the rate of change in the viscosity of the polymerizable composition with respect to time and is a value derived from Equation 2 defined as follows:

$$\ln y = \ln G + D \times x \quad \text{[Equation 2]}$$

In the above Equation 2, x is the elapsed time (hours) from the preparation of the composition to the measurement of viscosity, which ranges from 5 to 24, y is the viscosity (cps) of the polymerizable composition at 10° C. after time x, and G is the initial viscosity of the polymerizable composition at 10° C.

Another embodiment provides a polythiourethane-based compound prepared from the polymerizable composition.

Still another embodiment provides an optical material molded from the polythiourethane-based compound.

Advantageous Effects of the Invention

The polymerizable composition of the embodiment is capable of producing a plastic lens that is excellent in appearance without striae and/or bubbles, regardless of the kind of the polyisocyanate, the polythiol, and the catalyst. Specifically, the appearance, workability, dimensional stability, and the like of a plastic lens vary with the kinds of the polyisocyanate, the polythiol, and the catalyst as raw materials. It is possible to provide a polymerizable composition in which the characteristics as described above are considered together by controlling the kinds and contents of raw materials such that R calculated by the above Formula 1 satisfies a specific numerical range.

DETAILED DESCRIPTION FOR CARRYING OUT THE INVENTION

The polymerizable composition according to an embodiment comprises 1 to 5 types of a polyisocyanate compound, 1 to 5 types of a polythiol compound, and a catalyst represented by the following Formula 1, wherein R calculated by the following Equation 1 is a real number of 9.5 to 19.5:

$$R = 10 \times \left( \frac{A}{B} + Q \right) \quad \text{[Equation 1]}$$

In the above Equation 1, $$A = \sum_{i=1}^{n} \left( \frac{4200}{N_i} \times f_i \right), \; f_i = \left( \frac{m_i W_i}{o_i} \right) / C, \text{ and } C = \sum_{i=1}^{n} \left( \frac{m_i W_i}{o_i} \right),$$

n is the number of kinds of the polyisocyanate compound, $N_i$ is the content (% by weight) of NCO in the i-polyisocyanate compound, $m_i$ is the number of functional groups in the i-polyisocyanate compound, $W_i$ is the amount (g) of the i-polyisocyanate compound added, $o_i$ is the weight average molecular weight (g/mole) of the i-polyisocyanate compound, $$B = \sum_{j=1}^{l} (S_j \times P_j),$$

l is the number of kinds of the polythiol compounds, $S_j$ is the equivalent weight (g/eq.) of the j-polythiol compound, $$P_j = \left( \frac{u_j V_j}{t_j} \right) / Z \text{ and } Z = \sum_{j=1}^{l} \left( \frac{u_j V_j}{t_j} \right),$$

$u_j$ is the number of functional groups in the polythiol compound, $V_j$ is the amount (g) of the j-polythiol compound added, $t_j$ is the weight average molecular weight (g/mole) of the j-polythiol compound, Q is $\dfrac{\text{The molecular weight of the substituent } E \text{ of the compound represented by the formula 1(g/mol)} \times g \times D}{\text{The molecular weight of the compound represented by the following formula 1(g/mol)} \times K \times 1000}$

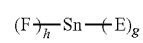 [Formula 1]

$(F)_h\text{—Sn—}(E)_g$

In the above Formula 1,

E is a halogen compound,

F is an aliphatic hydrocarbon having 1 to 30 carbon atoms or an aromatic hydrocarbon having 6 to 30 carbon atoms, h and g are each independently an integer of 1 to 3, h+g is 4, K is the amount of the compound represented by the above Formula 1 based on 100 parts by weight of the total amounts of the polyisocyanate compound and the polythiol compound, D is the rate of change in the viscosity of the polymerizable composition with respect to time and is a value derived from Equation 2 defined as follows:

$$\ln y = \ln G + D \times x \quad \text{[Equation 2]}$$

In the above Equation 2, x is the elapsed time (hours) from the preparation of the composition to the measurement of viscosity, which ranges from 5 to 24, y is the viscosity (cps) of the polymerizable composition at 10° C. after time x, and G is the initial viscosity of the polymerizable composition at 10° C.

For example, when the polymerizable composition comprises two polyisocyanates of a first polyisocyanate and a second polyisocyanate, n is 2, W1 is the amount (g) of the first polyisocyanate, W2 is the amount (g) of the second polyisocyanate, and other factors may be assigned in the same manner in the above Equation 1.

In the polymerizable composition, R calculated by the above Equation 1 may be a real number of 9.5 to 19.5. Specifically, in the polymerizable composition, R calculated by the above Equation 1 may be a real number of 9.5 to 19, a real number of 9.8 to 19, a real number of 9.8 to 18.5, or a real number of 9.8 to 18. If R is 9.5 or more, it is possible to prevent the problem that the reactivity between the polyisocyanate and the polythiol is too low, so that the generation of striae and bubbles due to the reaction imbalance in the terminal stage of polymerization can be increased, thereby lowering the production yield. In addition, if R is 19.5 or less, it is possible to prevent the problem that the reactivity is too high, so that the generation of striae and bubbles due to the reaction imbalance in the initial stage of polymerization is increased, thereby lowering the production yield. Therefore, in order to minimize the generation of striae and bubbles in the plastic lens thus produced, to thereby prevent such appearance defects and maximize the production yield, it is preferable to use a polymerizable composition wherein R is within the above-mentioned range.

A may be a real number of 80 to 120, and B may be a real number of 80 to 115. Specifically, A may be a real number of 82 to 117, a real number of 86 to 112, or a real number of 90 to 105. B may be a real number of 82 to 114, a real number of 85 to 112, or a real number of 87 to 110.

If A and B are within the above ranges, it is more advantages in that the dimensional stability can be improved in the polymerization and curing steps, thereby enhancing the heat resistance and suppressing the generation of cracks.

D may be a real number of 0.08 to 0.25, a real number of 0.09 to 0.24, or a real number of 0.10 to 0.23. If D is within the above range, it is possible to carry out homogeneous polymerization of the polymerizable composition, thereby suppressing the generation of striae and bubbles and enhancing the appearance and workability.

E may be at least one selected from the group consisting of fluorine (F), chlorine (Cl), bromine (Br), and iodine (I). Specifically, E may be chlorine.

F may be an alkyl group having 1 to 10 carbon atoms. Specifically, F may be methyl, ethyl, n-propyl, i-propyl, n-butyl, i-butyl, or t-butyl, The polymerizable composition comprises 1 to 5 types of a polyisocyanate compound, 1 to 5 types of a polythiol compound, and a catalyst represented by the above Formula 1. Specifically, the polymerizable composition may comprise 1 to 3 types of a polyisocyanate compound, 1 to 4 types of a polythiol compound, and a catalyst represented by the above Formula 1. Alternatively, it may comprise 1 or 2 types of a polyisocyanate compound, 1 or 2 types of a polythiol compound, and a catalyst represented by the above Formula 1.

In addition, the polymerizable composition may comprise 1 to 3 types of a polyisocyanate compound and 1 to 4 types of a polythiol compound.

Polyisocyanate Compound

The polyisocyanate compound may be a conventional one commonly used for the synthesis of polythiourethane. For example, the polyisocyanate compound may comprise at least one selected from the group consisting of an aliphatic isocyanate compound such as isophorone diisocyanate, dicyclohexylmethane-4,4-diisocyanate, hexamethylene diisocyanate, 2,2-dimethylpentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethyloctane, bis(isocyanatoethyl) carbonate, and bis(isocyanatoethyl) ether; an alicyclic isocyanate compound such as isophorone diisocyanate, 1,2-bis(isocyanatomethyl)cyclohexane, 1,3-bis(isocyanatomethyl)cyclohexane, 1,4-bis(isocyanatomethyl)cyclohexane, dicyclohexylmethane diisocyanate, cyclohexane diisocyanate, methylcyclohexane diisocyanate, dicyclohexyldimethylmethane isocyanate, 2,2-dimethyldicyclohexylmethane isocyanate, and norbornane diisocyanate; an aromatic isocyanate compound such as bis(isocyanatomethyl)benzene, bis(isocyanatoethyl)benzene, bis(isocyanatopropyl)benzene, bis(isocyanatobutyl) benzene, bis(isocyanatomethyl)naphthalene, bis(isocyanatomethyl)diphenyl ether, phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4-diphenylmethane diisocyanate, 3,3-dimethyldiphenylmethane-4,4-diisocyanate, bibenzyl-4,4-diisocyanate, bis(isocyanatophenyl)ethylene, 3,3-dimethoxybiphenyl-4,4-diisocyanate, hexahydrobenzene diisocyanate, hexahydrodiphenylmethane-4,4-diisocyanate, o-xylene diisocyanate, m-xylene diisocyanate, p-xylene diisocyanate, and toluene diisocyanate; an aliphatic isocyanate compound containing sulfur such as bis(isocyanatoethyl) sulfide, bis(isocyanatopropyl) sulfide, bis(isocyanatohexyl) sulfide, bis(isocyanatomethyl) sulfone, bis(isocyanatomethyl) disulfide, bis(isocyanatopropyl) disulfide, bis(isocyanatomethylthio)methane, bis(isocyanatoethylthio) methane, bis(isocyanatoethylthio)ethane, bis(isocyanatomethylthio)ethane, and 1,5-diisocyanato-2-isocyanatomethyl-3-thiapentane; an aromatic sulfide-based polyisocyanate compound such as 2-isocyanatophenyl-4-isocyanatophenyl sulfide, bis(4-isocyanatophenyl) sulfide, and bis(4-isocyanatomethylphenyl) sulfide; an aromatic isocyanate compound containing sulfur such as diphenyl sulfide-2,4-diisocyanate, diphenyl sulfide-4,4-diisocyanate, 3,3-dimethoxy-4,4-diisocyanatodibenzylthioether, bis(4-isocyanatomethylbenzene) sulfide, 4,4-methoxybenzenethioethylene glycol-3,3-diisocyanate, diphenyl disulfide-4,4-diisocyanate, 2,2-dimethyl diphenyl disulfide-5,5-diisocyanate, 3,3-dimethyl diphenyl disulfide-5,5-diisocyanate, 3,3-dimethyl diphenyl disulfide-6,6-diisocyanate, 4,4-dimethyl diphenyl disulfide-5,5-diisocyanate, 3,3-dimethoxydiphenyl disulfide-4,4-diisocyanate, and 4,4-dimethoxydiphenyl disulfide-3,3-diisocyanate; and a heterocyclic isocyanate compound containing sulfur such as 2,5-diisocyanatothiophene, 2,5-bis (isocyanatomethyl) thiophene, 2,5-diisocyanatotetrahydrothiophene, 2,5-bis (isocyanatomethyl)tetrahydrothiophene, 3,4-bis (isocyanatomethyl)tetrahydrothiophene, 2,5-diisocyanato-1,4-dithiane, 2,5-bis(isocyanatatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane. Specifically, the polyisocyanate compound may be one to five selected from the group consisting of isophorone diisocyanate, norbornene diisocyanate, m-xylene diisocyanate, toluene diisocyanate, hexamethylene diisocyanate, and cyclohexane diisocyanate.

The number (n) of kinds of the polyisocyanate compound may be 1 to 5. Specifically, the number (n) of kinds of the polyisocyanate compound may be 1 to 3 or 1 to 2.

The NCO content ($N_i$) of the polyisocyanate compound may be determined by the method specified in ISO 14896 "Plastics—Polyurethane raw materials—Determination of isocyanate content."

The number ($m_i$) of functional groups in the polyisocyanate compound may be 2 or 3.

The weight average molecular weight ($o_i$) of the polyisocyanate compound may be 100 to 900 g/mole or 150 to 800 g/mole.

Polythiol Compound

The polythiol compound may be a conventional one commonly used for the synthesis of polythiourethane. For example, the polythiol compound may comprise at least one selected from the group consisting of bis(2-(2-mercaptoethylthio)-3-mercaptopropyl) sulfide, 4-mercaptomethyl-1,8-dimercapto-3,6-dithiaoctane, 2,3-bis(2-mercaptoethylthio)

propane-1-thiol, 2,2-bis(mercaptomethyl)-1,3-propanedithiol, bis(2-mercaptoethyl) sulfide, tetrakis(mercaptomethyl)methane, 2-(2-mercaptoethylthio)propane-1,3-dithiol, 2-(2,3-bis(2-mercaptoethylthio)propylthio)ethanethiol, bis(2,3-dimercaptopropanyl) sulfide, bis(2,3-dimercaptopropanyl) disulfide, 1,2-bis(2-mercaptoethylthio)-3-mercaptopropane, 1,2-bis(2-(2-mercaptoethylthio)-3-mercaptopropylthio)ethane, 2-(2-mercaptoethylthio)-3-2-mercapto-3-[3-mercapto-2-(2-mercaptoethylthio)-propylthio]propylthio-propane-1-thiol, 2,2-bis-(3-mercapto-propionyloxymethyl)-butyl ester, 2-(2-mercaptoethylthio)-3-(2-(2-[3-mercapto-2-(2-mercaptoethylthio)-propylthio]ethylthio)ethylthio)propane-1-thiol, (4R,11S)-4,11-bis(mercaptomethyl)-3,6,9,12-tetrathiatetradecane-1,14-dithiol, (S)-3-((R-2,3-dimercaptopropyl)thio)propane-1,2-dithiol, (4R,14R)-4,14-bis(mercaptomethyl)-3,6,9,12,15-pentathiaheptane-1,17-dithiol, (S)-3-((R-3-mercapto-2-((2-mercaptoethyl)thio)propylthio)propylthio)-2-((2-mercaptoethyl)thio)propane-1-thiol, 3,3'-dithiobis(propane-1,2-dithiol), (7R,11S)-7,11-bis(mercaptomethyl)-3,6,9,12,15-pentathiaheptadecane-1,17-dithiol, (7R,12S)-7,12-bis(mercaptomethyl)-3,6,9,10,13,16-hexathiaoctadecane-1,18-dithiol, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), trimethylolpropane tris(3-mercaptopropionate), pentaerythritol tetrakis(2-mercaptoacetate), bispentaerythritol-ether-hexakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane, 1,4-dithiane-2,5-dimethanethiol, and 2-(2,2-bis(mercaptodimethylthio)ethyl)-1,3-dithiane. Specifically, the polythiol compound may be one to five selected from the group consisting of 4-mercaptomethyl-1,8-dimercapto-3,6-dithiaoctane, 4,8-dimercaptomethyl-1,11-dimercapto-3,6,9-trithiaundecane, pentaerythritol tetrakis(3-mercaptopropionate), pentaerythritol tetrakis(2-mercaptoacetate), and 1,4-dithiane-2,5-dimethanethiol.

The number (1) of kinds of the polythiol compound may be 1 to 5, 1 to 3, or 2 or 3.

The equivalent weight (g/eq.) (Sj) of the polythiol compound per unit molecular weight may be measured by the capacity titration method using the redox reaction of thiol and iodine.

The number ($u_j$) of functional groups in the polythiol compound may be an integer of 2 to 6 or an integer of 2 to 4.

The weight average molecular weight ($t_j$) of the polythiol compound may be 100 to 1,000 g/mole or 200 to 800 g/mole.

The polymerizable composition may comprise a polythiol compound and an isocyanate compound in a molar ratio of 0.5 to 1.5:1. Specifically, the polymerizable composition may comprise a polythiol compound and an isocyanate compound in a molar ratio of 0.8 to 1.2:1.

The catalyst may be a compound represented by the above Formula 1. Specifically, the catalyst may be at least one selected from the group consisting of dibutyltin dichloride, dimethyltin dichloride, diethyltin dichloride, dipropyltin dichloride, di-isopropyltin dichloride, and di-tert-butyltin dichloride.

The polymerizable composition may have a viscosity of 1,000 cps (centipoise) or more after it stands at 10° C. for 24 hours. Specifically, the polymerizable composition may have a viscosity of 1,000 to 10,000 cps or 1,500 to 10,000 cps after it stands at 10° C. for 24 hours. If the viscosity of the polymerizable composition after it stands at 10° C. for 24 hours is within the above range, it is possible to prevent the problem that the reactivity of the composition is too high, which lowers the workability, or that the reactivity of the composition is too low, which lowers the production yield.

When the polymerizable composition is made into a specimen having a diameter of 75 mm and a thickness of 10 mm, it may have a generation rate of bubbles of 0 to 10% and a generation rate of striae of 0 to 8%. Specifically, when the polymerizable composition is made into a specimen having a diameter of 75 mm and a thickness of 10 mm, it may have a generation rate of bubbles of 0 to 8% or 0 to 5% and a generation rate of striae of 0 to 7% or 0 to 5%.

Additive

The polymerizable composition may further comprise such additives as an internal mold release agent, an ultraviolet absorber, a polymerization initiator, a heat stabilizer, a blueing agent, a chain extender, a crosslinking agent, a light stabilizer, an antioxidant, and a filler, depending on the purpose thereof.

For example, the internal mold release agent may comprise at least one selected from the group consisting of a fluorine-based nonionic surfactant having a perfluoroalkyl group, a hydroxyalkyl group, or a phosphate ester group; a silicone-based nonionic surfactant having a dimethylpolysiloxane group, a hydroxyalkyl group, or a phosphate ester group; an alkyl quaternary ammonium salt such as trimethylcetylammonium salt, trimethylstearylammonium salt, dimethylethylcetylammonium salt, triethyldodecylammonium salt, trioctylmethylammonium salt, and diethylcyclohexadodecylammonium salt; and an acidic phosphate ester.

Examples of the ultraviolet absorber may include a benzophenone type, a benzotriazole type, a salicylate type, a cyanoacrylate type, an oxanilide type, or the like.

The polymerization initiator may include, for example, an amine type, a phosphorus type, an organotin type, an organic copper type, an organic gallium type, an organic zirconium type, an organic iron type, an organic zinc, and an organic aluminum.

The heat stabilizer may include, for example, a metal fatty acid salt type, a phosphorus type, a lead type, or an organotin type.

The blueing agent has an absorption band in the wavelength range from orange to yellow in the visible light region and has a function of adjusting the color of an optical material made of a resin. Specifically, the blueing agent may comprise a material that exhibits blue to violet color, but it is not particularly limited thereto. In addition, examples of the blueing agent include a dye, a fluorescent whitening agent, a fluorescent pigment, and an inorganic pigment. It may be properly selected in accordance with the properties required for an optical component to be produced and the resin color. The blueing agent may be used alone or in combination of two or more. In view of the solubility in the polymerizable composition and the transparency of the optical material to be produced, a dye is preferably used as the blueing agent. From the viewpoint of the absorption wavelength, the dye may particularly have a maximum absorption wavelength of 520 to 600 nm; and more particularly, it may have a maximum absorption wavelength of 540 to 580 nm. In addition, in terms of the structure of the compound, an anthraquinone-based dye is preferable as the dye. The method of adding the blueing agent is not particularly limited, and the blueing agent may be added to the monomers in advance. Specifically, various methods can be used; for example, the blueing agent may be dissolved in the monomers or may be contained in a master solution in a high concentration, the master solution being later diluted with the monomers or other additives and then added.

Polythiourethane-based Compound

Another embodiment provides a polythiourethane-based compound prepared from the polymerizable composition as described above.

The polythiourethane-based compound is prepared by polymerizing (and curing) the polythiol compound and the polyisocyanate compound. The reaction molar ratio of SH groups to NCO groups in the polymerization reaction may be 0.5 to 3.0, particularly 0.6 to 2.0 or 0.8 to 1.3. Within the above range, it is possible to enhance such properties as refractive index and heat resistance required for an optical material and the balance between them.

Optical Material

Still another embodiment provides an optical material molded from the polythiourethane-based compound as described above. Specifically, the optical material may be comprised of a molded article prepared by curing the polymerizable composition, in addition, the optical material is produced by polymerizing and molding the polymerizable composition (i.e., a polythiol compound, a polyisocyanate compound, and a catalyst).

First, the polymerizable composition is degassed under a reduced pressure and then injected into a mold for molding an optical material. Such degassing and mold injection may be carried out in a temperature range of, for example, 5 to 40° C. or 10 to 30° C. Once the composition is injected into the mold, polymerization is usually carried out by gradually heating the composition from a low temperature to a high temperature. The polymerization temperature may be, for example, 30 to 150° C., particularly 40 to 130° C. In addition, a reaction catalyst, which is conventionally used in the production of polythiourethane, may be employed in order to control the reaction rate. Specific examples of the reaction catalyst are as exemplified above.

Then, the polythiourethane-based optical material is released from the mold.

The optical material may have various shapes by changing the mold used in the production thereof. Specifically, it may be in the form of an eyeglass lens, a camera lens, a light emitting diode (LED), or the like. The optical material may be, for example, an optical lens, specifically a plastic optical lens.

The optical material may have a refractive index of 1.55 to 1.70 for light at 546 nm and an Abbe number of 25 to 50. Specifically, the optical material may have a refractive index of 1.58 to 1.68 for light at 546 nm and an Abbe number of 30 to 45.

EXAMPLE

Hereinafter, the present invention is explained in detail by Examples. The following Examples are intended to further illustrate the present invention without limiting its scope.

The polyisocyanates and the polythiols used in the following Examples and Comparative Examples are as shown in Tables 1 and 2 below.

TABLE 1

| | Chemical structure | Chemical name | Weight average molecular weight (g/mole) (o) | Number of functional groups (m) | NCO % (wt. %) |
|---|---|---|---|---|---|
| Iso 1 | [structure] | m-xylene diisocyanate | 188.2 | 2 | 43.8 to 44.7 |
| Iso 2 | [structure] | 1,3-bis (isocyanatomethyl)cyclohexane | 194.2 | 2 | 42.4 to 43.3 |
| Iso 3 | [structure] | hexamethylene diisocyanate | 168.2 | 2 | 49.1 to 50.0 |
| Iso 4 | [structure] | toluene diisocyanate | 174.2 | 2 | 48.4 to 48.3 |
| Iso 5 | [structure] | norbornene diisocyanate | 206.3 | 2 | 39.9 to 40.8 |

TABLE 1-continued

| | Chemical structure | Chemical name | Weight average molecular weight (g/mole) (o) | Number of functional groups (m) | NCO % (wt. %) |
|---|---|---|---|---|---|
| Iso 6 | | isophorone diisocyanate | 222.3 | 2 | 37.0 to 37.9 |

TABLE 2

| | Chemical structure | Chemical name | Weight average molecular weight (g/mole)(t) | Number of functional groups(u) | Eq. wt. (g/eq.) |
|---|---|---|---|---|---|
| Thiol 1 | | 4-mercaptomethyl-3,6-dithia-1,8-octanethiol | 260.5 | 3 | 87 to 93 |
| Thiol 2 | | 4,8-dimercaptomethyl-1,11-dimercapto-3,6,9-trithiaundecane | 366.7 | 4 | 94 to 102 |
| Thiol 3 | | pentaerythritol tetrakis(3-mercaptopropionate) | 488.7 | 4 | 124 to 127 |
| Thiol 4 | | pentaerythritol tetrakis(2-mercaptoacetate) | 446.6 | 4 | 112 to 116 |
| Thiol 5 | | 1,4-dithiane-2,5-dimethanethiol | 212.4 | 2 | 106 to 109 |

Catalyst 1: DMTC, dimethyltin dichloride
Catalyst 2: DBTC, dibutyltin dichloride Example 1

The polyisocyanate, the polythiol, and the catalyst were mixed in the composition shown in Table 3 below. Added thereto were 1.0 part by weight of 2-(2-hydroxy-5-tert-octylphenyl)benzotriazole as an ultraviolet stabilizer and 0.2 part by weight of Zelec® UN (acidic phosphate alkyl ester release agent, Stepan Company) as an internal mold release agent to prepare a polymerizable composition.

Examples 2 to 9 and Comparative Examples 1 to 3

Polymerizable compositions were each prepared in the same manner as in Example 1, except that the polyisocyanate, the polythiol, and the catalyst were mixed in the compositions shown in Table 3 below.

TABLE 3

| | Ex. 1 | Ex. 2 | Ex. 3 | Ex. 4 | Ex. 5 | Ex. 6 | Ex. 7 | Ex. 8 | Ex. 9 | C. Ex. 1 | C. Ex. 2 | C. Ex. 3 |
|---|---|---|---|---|---|---|---|---|---|---|---|---|
| Iso 1 | — | — | — | — | — | — | 121.5 g | — | — | — | — | — |
| Iso 2 | 154.4 g | 155.4 g | 155.4 g | 155.2 g | — | — | — | 95.1 g | 93.6 g | 154.5 g | 97.1 g | — |
| Iso 3 | — | — | — | — | — | 16.8 g | — | 13.7 g | — | — | — | 33.6 g |
| Iso 4 | — | — | — | — | — | — | 12.1 g | — | — | — | — | 139.4 g |
| Iso 5 | — | — | — | — | 164.9 g | — | — | — | — | — | — | — |
| Iso 6 | — | — | — | — | — | 88.9 g | — | 42.6 g | 36.0 g | — | — | — |
| Thiol 1 | — | — | — | — | 111.2 g | 32.6 g | 60.4 g | 56.7 g | 29.9 g | — | — | 130.3 g |
| Thiol 2 | 87.6 g | 88.2 g | — | — | — | — | 63.7 g | 59.9 g | 31.6 g | 88.1 g | — | — |
| Thiol 3 | — | — | — | 39.3 g | — | — | — | 39.9 g | 50.4 g | — | 122.3 g | — |

TABLE 3-continued

|  | Ex. 1 | Ex. 2 | Ex. 3 | Ex. 4 | Ex. 5 | Ex. 6 | Ex. 7 | Ex. 8 | Ex. 9 | C. Ex. 1 | C. Ex. 2 | C. Ex. 3 |
|---|---|---|---|---|---|---|---|---|---|---|---|---|
| Thiol 4 | 78.7 g | 77.3 g | 69.2 g | 68.9 g | — | 61.1 g | — | — | — | 78.7 g | — | — |
| Thiol 5 | — | — | 101.9 g | 102.2 g | — | — | — | — | 29.3 g | — | — | — |
| Catalyst | DMTC | DBTC | DMTC | DMTC | DBTC | DBTC | DBTC | DBTC | DMTC | DMTC | DBTC | DMTC |
| Amount of catalyst | 300 ppm | 210 ppm | 200 ppm | 295 ppm | 320 ppm | 150 ppm | 75 ppm | 120 ppm | 180 ppm | 30 ppm | 500 ppm | 75 ppm |

Test Example Property Measurement

The polymerizable compositions of Examples 1 to 9 and Comparative Examples 1 to 3 were each measured for the change in the viscosity at 10° C. Each of the plastic lenses produced therefrom was measured for the generation rates of striae and bubbles, refractive index, and Abbe number. The measurement results are shown in Table 4 below.

(1) Measurement of Viscosity

Each of the polymerizable compositions prepared in Examples 1 to 9 and Comparative Examples 1 to 3 was degassed at 10° C. and 2 torr for 1 hour and then filtered through a Teflon filter of 3 μm. The change in the viscosity of the polymerizable compositions thus filtered were measured for 24 hours at 10° C. using a non-contact viscometer (EMS-1000, Kyoto Electronics Manufacturing Co., Ltd.), and the rate of change in viscosity with time was calculated by the following Equation 2.

$$\ln y = \ln G + D \times x \quad \text{[Equation 2]}$$

(2) Generation Rate of Striae

The polymerizable compositions filtered in the same manner as in the above Section (1) were each injected into a glass mold assembled with an adhesive tape. The mold was allowed to stand at 10° C. for 5 hours and then heated from 10° C. to 120° C. at a rate of 5° C./min, so that the polymerization was carried out at 120° C. for 20 hours. Then, the cured resin having a size of 75 mm in diameter and 10 mm in thickness was further cured in the glass mold at 130° C. for 4 hours, and then the molded article (i.e., plastic lens) was released from the glass mold.

Light was transmitted through a plastic lens using a mercury lamp as a light source. The transmitted light was projected onto a white plate, and the presence or absence of a contrast was visually checked to determine the generation of striae. 100 plastic lenses were prepared and tested for evaluation of the generation rate of striae.

(3) Generation Rate of Bubbles

A plastic lens prepared in the same manner as in the above Section (2) was observed with the naked eyes under a mercury lamp. The generation of microbubbles was observed. 100 plastic lenses were prepared and tested for evaluation of the generation rate of bubbles.

(4) Refractive Index and Abbe Number

A plastic lens prepared in the same manner as in the above Section (2) was measured for the refractive index and Abbe number with E-line (nE) at 20° C. using a refractometer DR-M4 manufactured by Atago Co.

Specifically, the refractive index was measured for light with a wavelength of 546 nm.

TABLE 4

|  | D | R | Refractive index | Abbe number | Generation rate of striae (%) | Generation rate of bubbles (%) |
|---|---|---|---|---|---|---|
| Ex. 1 | 0.1596 | 11.01 | 1.5993 | 41 | 4 | 1 |
| Ex. 2 | 0.1702 | 11.16 | 1.5995 | 41 | 3 | 2 |
| Ex. 3 | 0.1495 | 11.25 | 1.6031 | 42 | 1 | 2 |
| Ex. 4 | 0.0973 | 9.88 | 1.6029 | 42 | 1 | 1 |
| Ex. 5 | 0.0615 | 10.32 | 1.6024 | 41 | 2 | 1 |
| Ex. 6 | 0.1159 | 10.31 | 1.5760 | 44 | 4 | 3 |
| Ex. 7 | 0.2214 | 16.77 | 1.6698 | 32 | 2 | 3 |
| Ex. 8 | 0.1356 | 12.01 | 1.5947 | 42 | 4 | 2 |
| Ex. 9 | 0.1674 | 12.30 | 1.5865 | 42 | 3 | 2 |
| C. Ex. 1 | 0.2409 | 35.19 | 1.5994 | 41 | 22 | 29 |
| C. Ex. 2 | 0.0265 | 7.73 | 1.5671 | 41 | 69 | 45 |
| C. Ex. 3 | 0.3357 | 20.02 | 1.6715 | 30 | 56 | 39 |

As shown in Table 4, in the polymerizable compositions of Examples 1 to 9, R was in the range of 9.5 to 19.5. The plastic lenses produced therefrom were excellent in appearance with low generation rates of striae and bubbles. In contrast, in the polymerizable compositions of Comparative Examples 1 to 3, R did not satisfy the above range. Thus, the plastic lenses produced therefrom had appearance defects with high generation rates of striae and bubbles.

The invention claimed is:

1. A polymerizable composition, which comprises 1 to 5 types of a polyisocyanate compound, 1 to 5 types of a polythiol compounds, and a catalyst represented by the following Formula 1,
wherein R calculated by the following Equation 1 is a real number of 9.5 to 19.5:

$$R = 10 \times \left(\frac{A}{B} + Q\right) \quad \text{[Equation 1]}$$

In the above Equation 1, $$A = \sum_{i=1}^{n} \left(\frac{4200}{N_i} \times f_i\right), f_i = \left(\frac{m_i W_i}{o_i}\right) / C, \text{ and } C = \sum_{i=1}^{n} \left(\frac{m_i W_i}{o_i}\right),$$

n is the number of kinds of the polyisocyanate compound,
$N_i$ is the content (% by weight) of NCO in the i-polyisocyanate compound,
$m_i$ is the number of functional groups in the i-polyisocyanate compound,
$W_i$ is the amount (g) of the i-polyisocyanate compound added,
$o_i$ is the weight average molecular weight (g/mole) of the i-polyisocyanate compound, $$B = \sum_{j=1}^{l} (S_j \times P_j)$$

l is the number of kinds of the polythiol compounds,
$S_j$ is the equivalent weight (g/eq.) of the j-polythiol compound, $$P_j = \left(\frac{u_j V_j}{t_j}\right) \Big/ Z\_Z = \sum_{j=1}^{l}\left(\frac{u_j V_j}{t_j}\right),$$

$u_j$ is the number of functional groups in the polythiol compound,
$V_j$ is the amount (g) of the j-polythiol compound added,
$t_j$ is the weight average molecular weight (g/mole) of the j-polythiol compound, $$Q \text{ is } \frac{\text{The molecular weight of the substituent } E \text{ of the compound represented by the formula } 1(\text{g/mol}) \times g \times D}{\text{The molecular weight of the compound represented by the following formula } 1(\text{g/mol}) \times K \times 1000}$$

$$(F)_h\text{—Sn—}(E)_g \qquad \text{[Formula 1]}$$

In the above Formula 1,
E is a halogen compound,
F is an aliphatic hydrocarbon having 1 to 30 carbon atoms or an aromatic hydrocarbon having 6 to 30 carbon atoms,
h and g are each independently an integer of 1 to 4,
h+g is 4,
K is the amount of the compound represented by the above Formula 1 based on 100 of the total amounts of the polyisocyanate compound and the polythiol compound,
D is the rate of change in the viscosity of the polymerizable composition with respect to time and is a value derived from Equation 2 defined as follows:

$$\ln y = \ln G + D \times x \qquad \text{[Equation 2]}$$

In the above Equation 2,
x is the elapsed time (hours) from the preparation of the composition to the measurement of viscosity, which ranges from 5 to 24,
y is the viscosity (cps) of the polymerizable composition at 10° C. after time x, and
G is the initial viscosity of the polymerizable composition at 10° C.

2. The polymerizable composition of claim 1, wherein A is a real number of 80 to 120, and B is a real number of 80 to 115.

3. The polymerizable composition of claim 1, wherein D is a real number of 0.08 to 0.25.

4. The polymerizable composition of claim 1, wherein R is a real number of 9.8 to 18.

5. The polymerizable composition of claim 1, wherein E is at least one selected from the group consisting of fluorine (F), chlorine (Cl), bromine (Br), and iodine (I).

6. The polymerizable composition of claim 1, wherein F is an alkyl group having 1 to 10 carbon atoms.

7. The polymerizable composition of claim 6, wherein F is methyl, ethyl, n-propyl, i-propyl, n-butyl, i-butyl, or t-butyl.

8. The polymerizable composition of claim 1, which has a viscosity of 1,000 cps (centipoise) or more after it stands at 10° C. for 24 hours.

9. The polymerizable composition of claim 1, wherein when the polymerizable composition is made into a specimen having a diameter of 75 mm and a thickness of 10 mm, it has a generation rate of bubbles of 0 to 10% and a generation rate of striae of 0 to 8%.

10. The polymerizable composition of claim 1, which comprises 1 to 3 types of a polyisocyanate compound and 1 to 4 types of a polythiol compound.

11. A polythiourethane-based compound prepared from the polymerizable composition of claim 1.

12. An optical material molded from the polythiourethane-based compound of claim 11.

13. The optical material of claim 12, which has a refractive index of 1.55 to 1.70 for light at 546 nm and an Abbe number of 25 to 45.

* * * * *